Oct. 25, 1955
N. E. RICE
2,721,613
APPARATUS FOR SHEARING TUBE
Filed Sept. 6, 1951
4 Sheets-Sheet 1
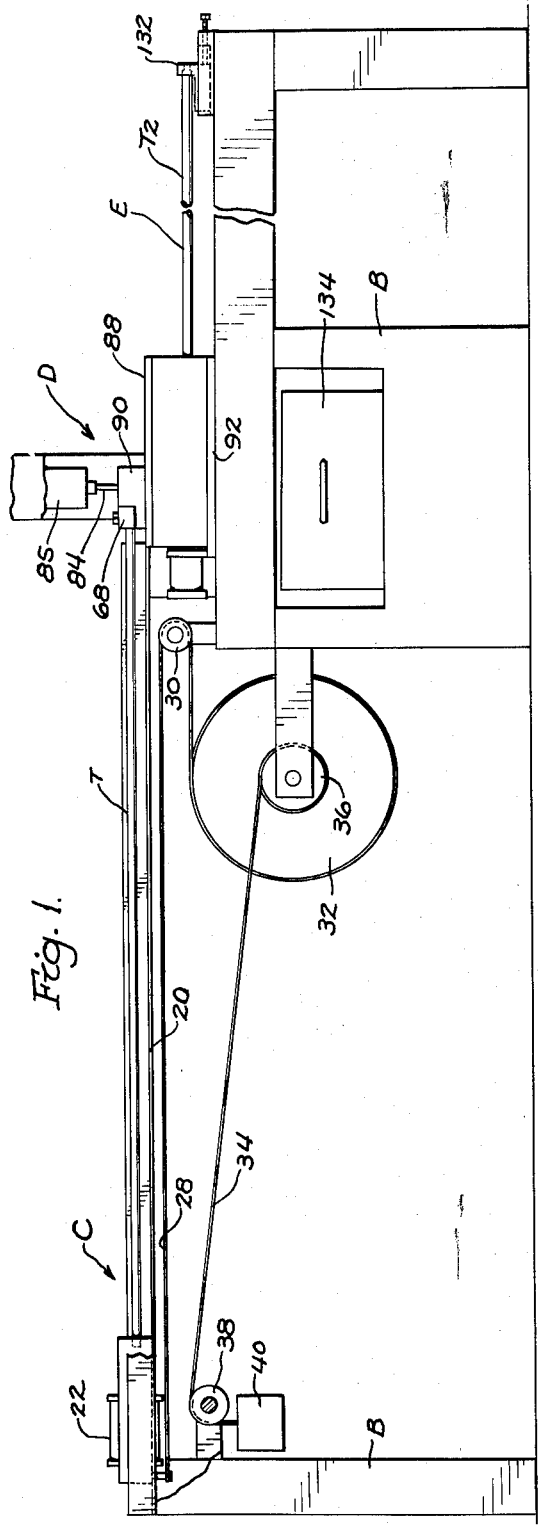
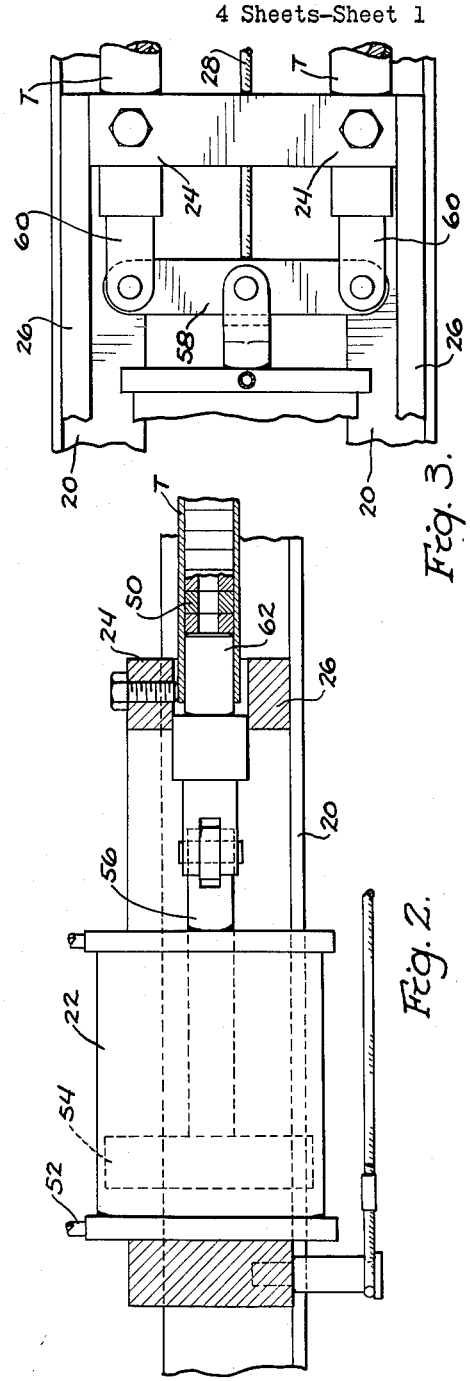
INVENTOR.
Nelson E. Rice
BY
Barnes, Kisselle, Laughlin & Raisch
ATTORNEYS.

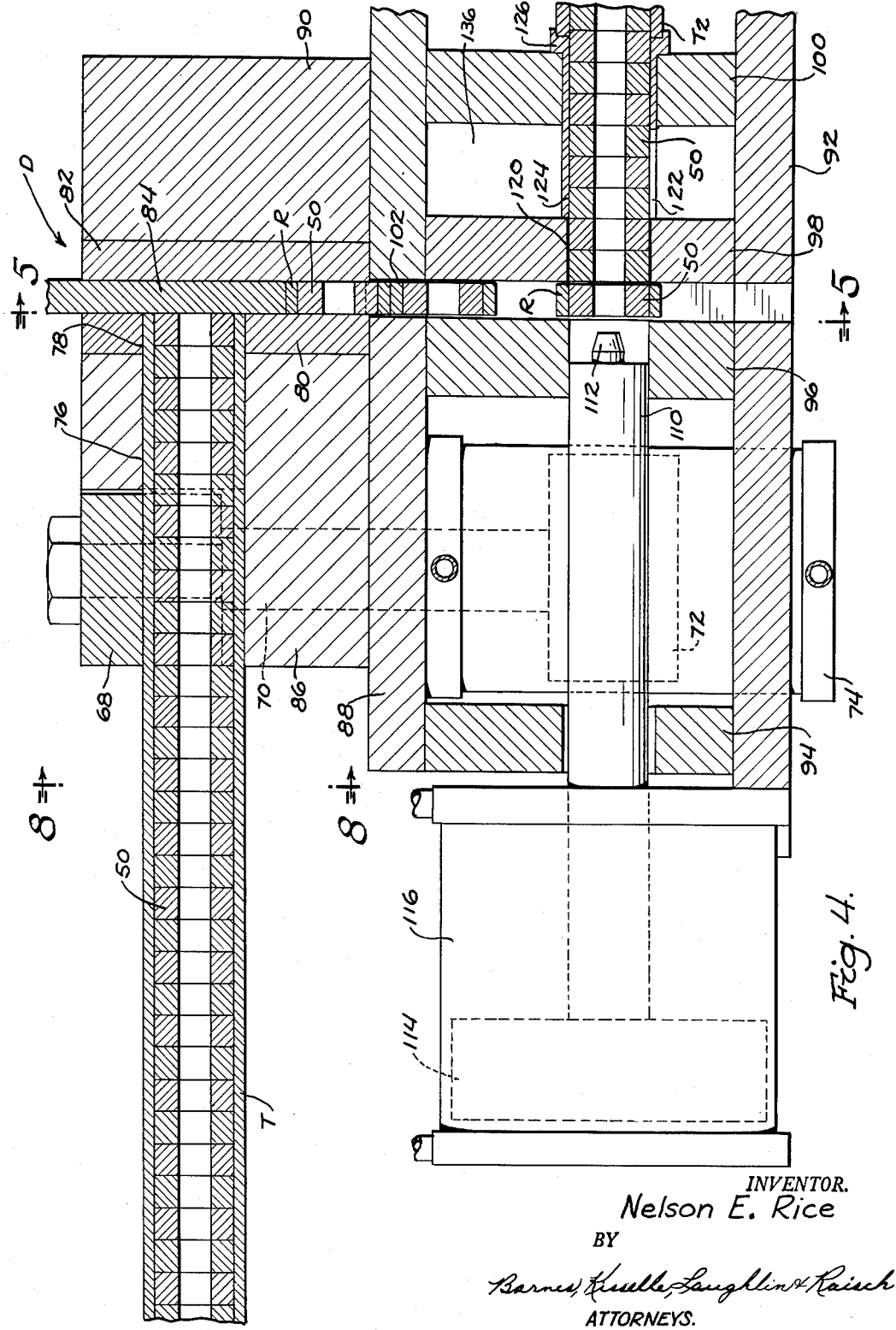

Oct. 25, 1955 N. E. RICE 2,721,613
APPARATUS FOR SHEARING TUBE
Filed Sept. 6, 1951 4 Sheets-Sheet 3
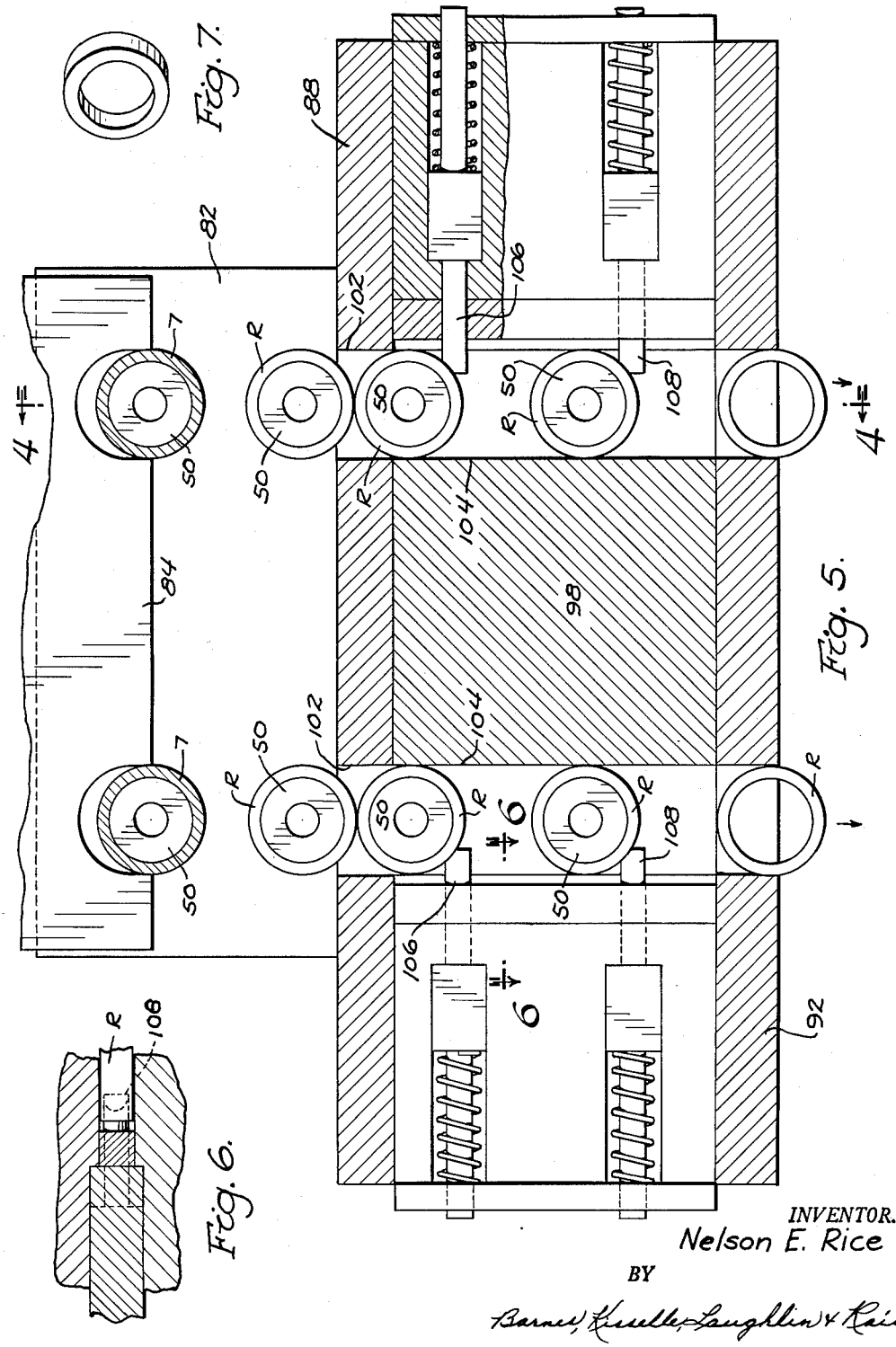
INVENTOR.
*Nelson E. Rice*
BY
*Barnes, Kisselle, Laughlin & Raisch*
ATTORNEYS.

Oct. 25, 1955 N. E. RICE 2,721,613
APPARATUS FOR SHEARING TUBE
Filed Sept. 6, 1951 4 Sheets-Sheet 4

INVENTOR.
Nelson E. Rice
BY
Barnes, Kisselle, Laughlin & Raisch
ATTORNEYS.

United States Patent Office 2,721,613
Patented Oct. 25, 1955

2,721,613

APPARATUS FOR SHEARING TUBE

Nelson E. Rice, Grosse Pointe, Mich., assignor of one-half to Harry G. Rice, Detroit, Mich.

Application September 6, 1951, Serial No. 245,382

4 Claims. (Cl. 164—48)

This invention relates to an apparatus for shearing tube, or tubing.

It is an object of the invention to provide a novel method of shearing ring portions from tubes in large quantities; for example, as many as eighty rings a minute for each particular tube in the machine. The speed can be increased depending on the nature of the material and the size of the machine.

The one particular use for the machine is the forming of what are called rotating bands or shells made usually of copper or gilding metal.

It is an object to provide a method and a machine wherein tube is sheared both from the inside wall and the outside wall to insure a clean cut with practically no burr and to avoid tearing of the metal, which results in imperfect rings.

Briefly, the invention consists of a method of shearing tube which comprises introducing to the tube prior to the shearing action a shearing blade which co-operates with the shear action on the outside of the tube.

A further object is the provision of a machine which embodies one mechanical means for performing the method.

Other objects and features of the invention relating to the details of operation and construction will be apparent in the following description and claims.

Drawings accompany the specification, and the various views thereof may be briefly described as:

Figure 1, an elevation of the machine showing all of the parts in assembled relation.

Figure 2, a side elevation of a device for positioning the internal shear blades within the tube.

Figure 3, a plan view of the actuating mechanism as used on a plurality of tubes.

Figure 4, a vertical section through the shearing portion of the machine showing the shearing action and a means for re-loading the internal shear blades.

Figure 5, a transverse section through the machine on line 5—5 of Figure 4 illustrating the various steps in the shearing operation.

Figure 6, a sectional view on line 6—6 of Figure 5.

Figure 7, a view of the ring portion cut from the tube.

Figure 8:
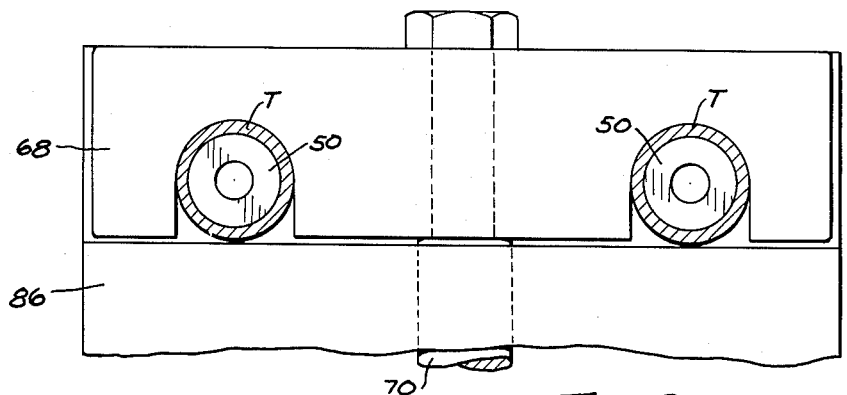

Figure 8, a sectional view on line 8—8 of Figure 4 showing the clamping means for the end of the tube which is to be sheared.

Figure 9:
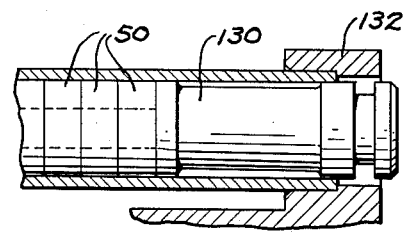

Figure 9, a sectional view of the tube which is being loaded.

Figure 10:
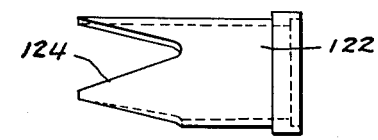

Figure 10, a detail of a tube cage at the loading end of the tube being prepared for shearing.

Figure 11:
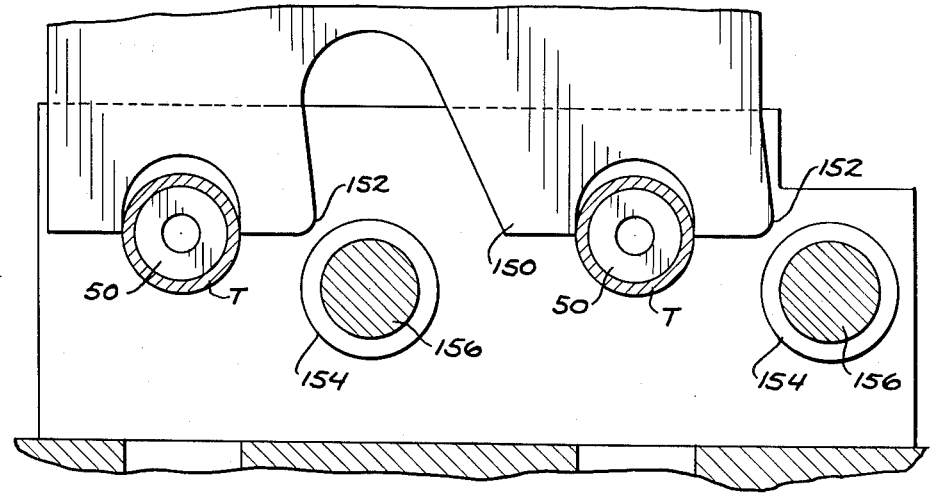

Figure 11, a view of a modified construction in which a double shear action is accomplished during the cutting operation.

Referring to the drawings, a shearing machine is shown having a base B, a tube supporting section C, a shearing section D, and a loading section E.

The tube supporting section extends for a considerable distance to the left of the shearing head and consists of a slide 20 for supporting a cylinder 22 and tube holding clamps 24 spaced side by side and mounted on a frame 26 which moves with the cylinder 22 on the slide 20.

Tubes T are shown clamped at the left-hand ends by the clamps 24 in Figure 3. A feeding mechanism for the slide frame 26 consists of a cable 28 running over a pulley 30 to a drum 32, around which it is wrapped. A cable 34 acting on a smaller drum 36 coaxial with and attached to drum 32 extends around a pulley 38 to a weight 40.

Since the slide frame 26 is freely movable on the slides 20 the weight 40 will exert pressure to the right on the frame, thus urging the tubes T toward the shearing portion D of the machine.

The tubes T are filled with small internal shear blades 50 which consist of rings of hardened metal having a width equal to the desired length of the ring to be cut. The diameter of the rings is slightly smaller than the internal diameter of the tubes so that the rings are slidable in the tubes.

The cylinder 22 may either be an air cylinder or a hydraulic cylinder having a feed pipe 52 and a piston 54. Extending from the cylinder is a rod 56 which connects with a yoke bar 58. The bar 58 has pivotally connected to it at either end supplemental plungers 60 having an end 62 (see Figure 2) which enters the tube T and exerts a force against the shear rings or cutters 50.

Referring now to Figure 4, the shearing portion of the machine D is shown in vertical section. The tubes T are shown entering this portion from the left, the tubes being filled with the internal cutters 50 and the right end of the tubes being clamped by a transverse clamp member 68 which is actuated by a rod 70 extending from a piston 72 in a vertical cylinder 74.

The tube enters a guideway 76 and a recess 78 in a shear plate 80. A second plate 82 is positioned on the other side of a shear blade 84 which is moved up and down by a suitable force applying mechanism 85.

A clamping block 86 which co-operates with the clamp bar 68 is supported by a table plate 88 which also supports the plates 80 and 82 as well as a locating block 90 on the right side of plate 82. A bed plate 92 supports the table plate 88 through vertical members 94, 96, 98 and 100. The bed plate 92 is supported on the base of the machine.

With continued reference to Figure 4 and additional reference to Figure 5, it will be seen that the table plate 88 has apertures 102 large enough to pass shearing rings R as they are cut from the tube T in a manner which will be described later. These rings R pass downwardly through a passage 104 formed between members 96 and 98.

Extending into these passages at two different levels from the sides of the machine are spring pressed plungers 106 and 108. These plungers extend a short distance into the passages 104 to block the free downward movement of the rings R at two stages in the movement.

The rings will be forced past the plungers by the downward motion of the shear blade 84. When the rings reach the second stop, plunger 108, a clearing plunger 110 (shown in Figure 4) having a pick up projection 112 is urged forward by a piston 114 in a pneumatic cylinder 116.

The pick up projection 112 will enter the central opening of the internal cutters 50 and will project the cutters into a passage 120 leading to a cage or thimble 122. This thimble, as viewed in Figure 10, has projecting fingers 124 with axially extending spaces in between. The thimble at the right-hand end has an annular flange 126 which forms a receiving recess for the end of a tube T₂ which is a tube being prepared for shearing.

The internal cutters 50 are passed into this tube by the plunger 110 and a leader bolt 130 is positioned in the tube to provide a positioning means for the cutters 50 as they pass into the tube (see Figure 9.) The other end of the tube being loaded is held in a small clamp 132.

After the internal cutters 50 have been removed from the rings R by the plunger 110 the ring will be forced downwardly out of the passages 104 to a receiving box 134 in the base of the machine.

In the operation of the machine the tube T is loaded as shown in Figure 1 and constantly urged to the right by the weight 40 acting through the cables 34 and 28. Suitable control mechanism is provided to release the clamp 68 after each shearing action to permit the weights to move the tubes forward against the plate 82 upon retraction of the shear blade 84.

After this feeding motion the clamp 68 is again moved into clamping position and the cylinder 22 is actuated to exert a pressure on the internal cutters which fill the tube T, moving the end cutters flush against the plate 82. The shear blade may then be actuated downwardly to shear off a ring R with an included internal cutter 50.

In Figure 5 the shear blade is in the up position. As it descends it will be apparent that shearing action will occur between the edge of the shear plate 80 and the edge of the shear blade 84 adjacent the plate 80. Also the internal cutter 50 has a shear edge on the left-hand side which will operate to cut the wall of the tube from the inside by reason of the pressure which is transmitted through the tube from the shear blade 84. Thus the tube is cut from the inside and the outside and a ring R is severed therefrom with an included cutter ring 50.

In Figure 4 the shear blade is shown in the down position. The rings R with the included cutter will then descend into the passages 104 and be forced one by one past the plungers 106 where they will drop down upon the plunger 108. There the plunger 110 will remove the cutter as previously described and the rings will fall into the collector box 134.

The pressure on the discs 50 within the tube T is relieved immediately after the shearing operation by relieving pressure from the cylinder 22. After this the shear blade goes up, the clamp 68 is lifted, the tube advances, clamp 68 moves into clamping position, pressure is again applied to the internal rings, and the cycle repeats itself.

The function of the thimble or cage 122 is to feed the rings 50 to the tube T₂ and also to permit any chips that might occur in the shearing action to filter down into the space 136 to prevent irregular spacing of the rings 50 in the tube T₂.

In Figure 11 a modified cutting action is shown. The tubes T with the rings 50 are shown and a cutter blade 150 is shown positioned relative to these tubes at the top of the stroke. The cutter has two cam surfaces 152 which are adapted to co-operate with hardened rollers 154 mounted on bearing posts 156. In downward actuation of this cutter blade 150 the shearing action on the tubes will start in a direct downward direction but as soon as the cam surfaces 152 strike the rollers 154 the downward motion of the blade 150 will be changed to a combination of downward and side-ward motion to the left, thus creating another shear motion transversely of the tube.

It is believed that this cutting motion in combination with the outside shearing edges and the inside shearing members will cause a complete cutting action of the walls of the tube which is accomplished with less actual force than that required for the straight shear shown in the other figures. A cleaner cut will result from this compound motion.

I claim:

1. An apparatus for shearing a plurality of rings from a tube, which comprises a tube clamp for the ends of one or more tubes to be sheared, a shear plate mounted adjacent said clamp to travel in a direction transverse to the tubes, means to exert a feed force on said tubes toward said plate, a plurality of cutters filling said tubes having axial lengths equal to the rings to be cut, means forming a receiving recess adjacent said shear plate to receive sheared rings containing cutters, and separator means to separate said rings and cutters and to position said cutters for re-use in additional tubes.

2. An apparatus as described in claim 1 in which the separator means comprises a plunger, a locator on the end of said plunger to position said rings and cutters, and a tube holder for the end of a tube to be filled positioned to align with said plunger.

3. An apparatus as described in claim 1 in which the separator means comprises a plunger, a locator on the end of said plunger to position said rings and cutters, a tube holder for the end of a tube to be filled comprising a cylindrical thimble having axially extending openings in the sides and one end formed to receive and hold the end of a tube, and means mounting said tube holder in a chamber and in alignment with said plunger whereby said plunger can force said cutters through said thimble into said tube in readiness for cutting.

4. An apparatus for shearing a plurality of rings from a tube, which comprises a tube clamp for the ends of one or more tubes to be sheared, a shear plate mounted adjacent said clamp to travel in a direction transverse to the tubes, means to exert a feed force on said tubes toward said plate, a plurality of cutters filling said tubes having axial lengths equal to the rings to be cut, means forming a receiving recess adjacent said shear plate to receive sheared rings containing cutters, and separator means in said receiving recess to separate said rings and cutters and to position said cutters for re-use in additional tubes.

References Cited in the file of this patent

UNITED STATES PATENTS

| | | |
|---|---|---|
| 1,715,138 | Lothrop | May 28, 1929 |
| 2,323,546 | Krueger | July 6, 1943 |
| 2,397,048 | Roop | Mar. 19, 1946 |
| 2,518,433 | Friedman | Aug. 8, 1950 |